May 30, 1944.    L. J. MacKAY    2,350,243
UTENSIL COVER
Filed Nov. 2, 1942
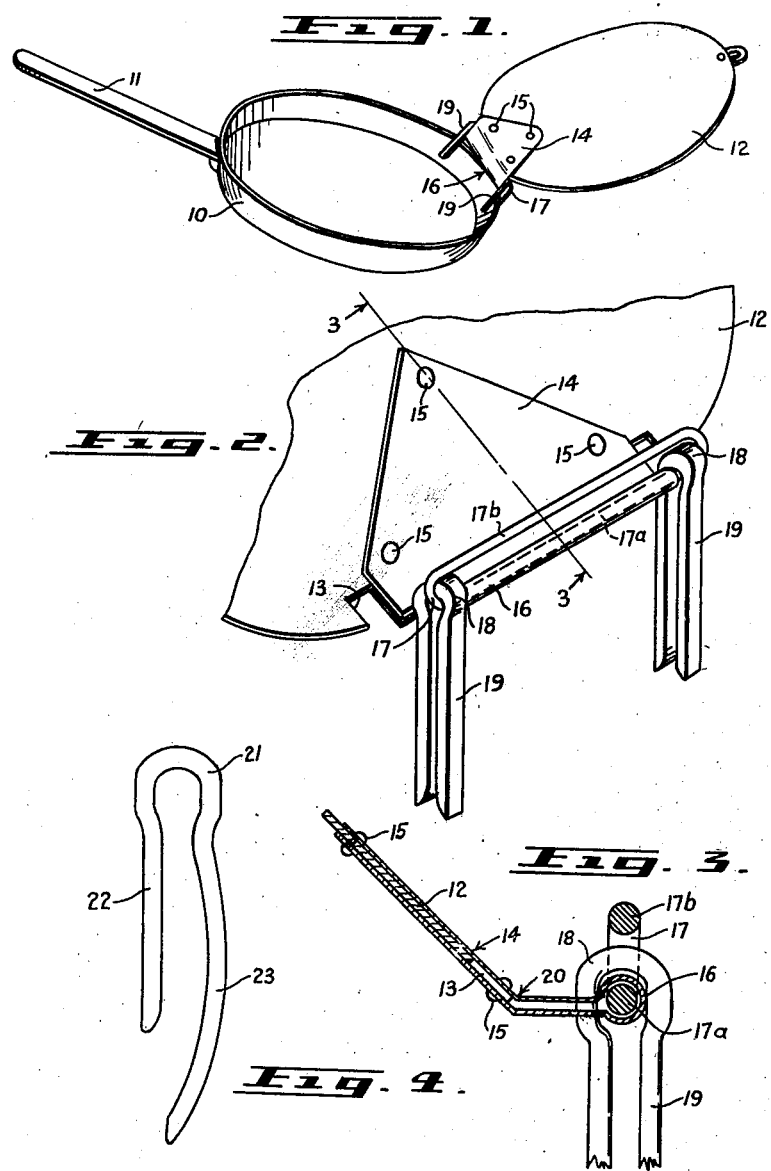
INVENTOR
Lauchlin John MacKay
By Ralph Burch
Attorney Patented May 30, 1944

2,350,243

UNITED STATES PATENT OFFICE 2,350,243

UTENSIL COVER

Lauchlin John MacKay, Chapman Camp, British Columbia, Canada

Application November 2, 1942, Serial No. 464,238
In Canada October 3, 1942

1 Claim. (Cl. 220—31)

This invention relates to hinged covers and more particularly to a removable cover which may be easily applied to any suitable cooking utensil.

It is a well known fact that covers for frying pans, pots and the like cause considerable inconvenience to chefs, housewives and others who prepare food due to the fact that when they are removed from the utensil for any purpose they must be placed in a convenient location which is not always available or alternatively they must be held in the hand while the work is done with the other hand. Conversely, a cover secured to each utensil is impractical as it is often desirable to change cover or dispense with cover for certain types of cooking and in any event it presents problems when cleaning or storing the utensil.

It is, therefore, a principal object of my invention to provide a hinged cover which may be swung from a closed position over the top of the utensil to an open position quite free of the top of the utensil so that the person using same may easily get at the contents disposed therein. It will be apparent that the cover may also be swung from the open position to the closed position. Further, I provide means whereby my cover can be detachably secured to any suitable utensil in a very simple manner to the end that the cover is interchangeable and may be used on various cooking utensils.

Another important feature of my invention lies in the fact that I attain the objects hereinbefore noted by means of a very simple, yet durable and efficient structural arrangement which permits the manufacture and sale of the invention at a low cost.

In brief the invention consists of a disk suitable to cover a cooking utensil, a plate secured to the disk and forming a channel to receive what may ordinarily be described as the hinge pintle which also forms a back stop so that the cover opening movement is restricted to a predetermined, convenient position. The combination pintle and back stop is held at each extremity in spring clamps by means of which the unit is removably clamped to the side wall of the utensil.

With the above noted and other objects in view which may appear as the description proceeds the invention resides in the novel construction, combination and arrangement of cooperating parts as will hereinafter be explained in detail, claimed and shown in the accompanying drawing forming part of this application and in which:

Fig. 1 is a perspective view of my invention attached to a frying pan; the cover is shown in the open position.

Fig. 2 is a fragmentary perspective view of my invention showing the cover securing means in detail.

Fig. 3 is a sectional view taken on the line 3—3 of Figure 2, the elements are exploded slightly for clarity.

Fig. 4 is a side elevational view of a clamp showing a slightly modified form thereof.

Referring more in detail to the drawing in which similar reference numerals designate corresponding parts throughout the several views it will be seen that the invention is attached to a cooking utensil such as the frying pan 10, shown in Figure 1. It may be herein noted that a convenient place of attachment is opposite the handle 11, but the device is not limited to any single position around the peripheral edge of the utensil. It may be further noted that, necessarily, the cover must be diametrically equal to the utensil at least to obtain efficient results but on the other hand the cover may be diametrically greater than the utensil without impairing the efficiency thereof, it will therefore, be apparent that a different cover will not be necessary for every slight difference in the size of utensils.

The device itself consists of a cover proper 12, adapted to fit over the top of a utensil. The said cover is notched at 13, in its periphery to provide adequate clearance for the hinge components. In its preferred form a plate 14, is bent back on itself to form two surfaces between which the cover is disposed and secured by rivets or other means indicated by the numeral 15. At the free or outer end of the plate, that is, where it is bent back on itself to form the two equal plate members it is channelled 16. One side of an elongated, heavy wire loop is disposed through the channel and forms what may be called a pintle 17a, the opposite side of the elongated loop is disposed above the channel and forms a back stop 17b, whereby the opening movement of the lid is restricted as will hereinafter be explained in detail.

The loop 17, is held upright at each extremity in the eye 18, of a bifurcated spring clamp 19, which is crimped to the lower or pintle side 17a, of the loop 17, adjacent the extremities of the channel portion 16, so that the channel is rotatable on the pintle to the end that the lid may be raised and lowered. This arrangement is clearly shown in Figure 3, which is slightly exploded, that is the parts are separated for purpose of clarity.

The plate 14, is bent at 20, the distance from the bent line 20, to the channel 16, being at least as great as the distance between the portions 17a, and 17b, so that when the cover is raised upward the said cover will be overbalanced and tend to rest against the back stop as shown in Figure 1, with no danger of it inadvertently falling back over the cooking utensil.

The clamps are pressed onto the side wall of the utensil which is disposed between the bifurcated legs 19, which tightly grip the said side wall.

In modification of Figure 4, I have shown a clamp 21, provided with a short leg 22, and a longer leg 23, which is curved toward the short leg at its extremity whereby the legs may readily straddle a thick utensil or one having a knurled edge or a pyrex type at the top where the legs are relatively wide apart whilst still obtaining the desired crimping action at the extremities of the legs. The remaining components of the invention are similar to the embodiment of Figures 1, 2 and 3.

It is believed that the construction and advantages of the structure shown may be apparent from the foregoing paragraphs taken in conjunction with the accompanying drawing without further detailed description.

While the preferred embodiment of the invention has been disclosed, it is understood that minor changes in the details of construction, combination and arrangement of co-operating parts may be resorted to within the scope of what is claimed without departing from the spirit of the invention.

I claim:

The combination with a cooking utensil, of a cover plate, a hinge plate bent to overlap the top and bottom faces of the cover plate at its marginal edge and secured thereto, said hinge plate having a sleeve formed at its edge beyond the edge of the cover plate, an elongated closed wire loop having one side journaled in the sleeve of said hinge plate with the opposite side disposed above the sleeve to form a back stop for said cover plate when the cover plate is in fully opened position, the ends of the loop extending beyond the ends of the sleeve, and resilient substantially parallel U-shaped clamps straddling the said one side of the loop at each end of the sleeve and crimped in fixed engagement with said one side, the legs of said clamps being spaced apart to resiliently grip the wall of the utensil to detachably secure the cover plate to the utensil.

LAUCHLIN JOHN MacKAY.